United States Patent

Kostrzewa et al.

(10) Patent No.: US 9,491,376 B2
(45) Date of Patent: Nov. 8, 2016

(54) FLAT FIELD CORRECTION FOR INFRARED CAMERAS

(71) Applicant: FLIR Systems, Inc., Wilsonville, OR (US)

(72) Inventors: Joseph L. Kostrzewa, Buellton, CA (US); Vu L. Nguyen, Goleta, CA (US); Theodore R. Hoelter, Goleta, CA (US)

(73) Assignee: FLIR Systems, Inc., Wilsonville, OR (US)

(*) Notice: Subject to any disclaimer, the term of this patent is extended or adjusted under 35 U.S.C. 154(b) by 486 days.

(21) Appl. No.: 13/764,690

(22) Filed: Feb. 11, 2013

(65) Prior Publication Data

US 2013/0147966 A1    Jun. 13, 2013

Related U.S. Application Data

(63) Continuation-in-part of application No. 12/391,156, filed on Feb. 23, 2009, now Pat. No. 8,373,757.

(51) Int. Cl.
*H04N 5/33*     (2006.01)
*H04N 5/365*    (2011.01)

(52) U.S. Cl.
CPC .............. *H04N 5/33* (2013.01); *H04N 5/3655* (2013.01)

(58) Field of Classification Search
CPC ..................... H04N 5/33; H04N 5/3651
See application file for complete search history.

(56) References Cited

U.S. PATENT DOCUMENTS

| | | | |
|---|---|---|---|
| 6,184,529 B1* | 2/2001 | Contini | 250/347 |
| 6,812,465 B2 | 11/2004 | Parrish et al. | |
| 6,875,979 B2 | 4/2005 | Cope | |
| 6,929,410 B2 | 8/2005 | Nguyen et al. | |
| 7,470,902 B1 | 12/2008 | Kraemer et al. | |
| 7,995,859 B2 | 8/2011 | Högasten | |
| 2003/0025067 A1 | 2/2003 | Tsai et al. | |
| 2005/0231623 A1* | 10/2005 | Suzuki | H04N 3/1562 348/311 |
| 2005/0231627 A1* | 10/2005 | Murphy | G01J 5/62 348/345 |
| 2008/0210872 A1 | 9/2008 | Grimberg | |
| 2009/0272888 A1* | 11/2009 | Nugent | G01D 18/00 250/252.1 |

FOREIGN PATENT DOCUMENTS

JP        4207588        1/2009

* cited by examiner

*Primary Examiner* — Obafemi Sosanya

(74) *Attorney, Agent, or Firm* — Haynes and Boone, LLP

(57) ABSTRACT

Various techniques are provided to perform flat field correction for infrared cameras. In one example, a method of calibrating an infrared camera includes calibrating a focal plane array (FPA) of the infrared camera to an external scene to determine a set of flat field correction values associated with a first optical path from the external scene to the FPA. The method also includes estimating a temperature difference between the FPA and a component of the infrared camera that is in proximity to the first optical path. The method also includes determining supplemental flat field correction values based on, at least in part, the first set of flat field correction values, where the supplemental flat field correction values are adjusted based on the estimated temperature difference before being applied to thermal image data obtained with the infrared camera. The method also includes storing the supplemental flat field correction values.

24 Claims, 5 Drawing Sheets

FLAT FIELD CORRECTION FOR INFRARED CAMERAS

CROSS-REFERENCE TO RELATED APPLICATIONS

This continuation-in-part patent application claims the benefit of and priority to U.S. patent application Ser. No. 12/391,156 filed Feb. 23, 2009 and entitled "FLAT FIELD CORRECTION FOR INFRARED CAMERAS" which is hereby incorporated by reference in its entirety.

TECHNICAL FIELD

The invention relates generally to thermal imaging systems and, more particularly, to systems and methods for calibrating thermal imaging devices, such as focal plane arrays.

BACKGROUND

Focal plane arrays (FPAs) which detect infrared radiation are well known in the art and are used by infrared cameras to provide thermal images. For example, infrared radiation passing through an optical path of the infrared camera is received by infrared detectors of the FPA, which provide thermal image data for pixels of a two-dimensional image.

The quality of thermal images provided by FPAs may be degraded due to non-uniform responses among the individual infrared detectors to incident infrared radiation. Factors contributing to the performance degradation may include, for example, variations in the physical characteristics (i.e., dimensions and locations), infrared radiation absorption coefficient, resistance, temperature coefficient of resistance (TCR), heat capacity, and/or thermal conductivity of the individual infrared detectors. FPA performance may also be degraded by non-uniform out-of-field infrared radiation from surrounding mechanical components. Because the magnitude of the non-uniformity may be large in comparison to the magnitude of the actual response due to the incident infrared radiation, various techniques are typically used to compensate for the non-uniformity and obtain a desirable signal-to-noise ratio.

For example, the FPA may be calibrated over one or more levels of photon flux by inserting a shutter (i.e., an optical obscuration also referred to as a calibration flag) into the optical path of the infrared camera. The temperature of the shutter may be adjusted to emulate a thermal black body detected by the FPA. The FPA takes one or more data frames or snapshots of the shutter to calibrate its response, and the collected data may then be used to calibrate the FPA to provide a more uniform response. The shutter location is often chosen to be as close as possible to the FPA (i.e., between the FPA and the lens) to reduce the shutter size and thus provide a more compact infrared camera.

Although the above-described shutter calibration technique permits calibration of the FPA for the portion of the optical path between the shutter and the FPA, it does not calibrate the FPA to correct for the thermal non-uniformity of the shutter's paddle and the out-of-field infrared radiation caused by other portions of the optical path including, for example, lenses, windows, mounting hardware, or other components of the infrared camera which may be implemented in front of the shutter (i.e., not between the shutter and the FPA). Such non-uniformities may further degrade FPA performance by radiometrically distorting the thermal image data detected by the FPA. Accordingly, there is a need for an improved approach to the calibration of an FPA within an infrared camera.

SUMMARY

One or more embodiments may be used to provide flat field correction for infrared cameras. For example, infrared detectors of an infrared camera may be calibrated to determine flat field correction values, which may be used to correct for non-uniformities associated with optical paths of the infrared camera. Supplemental flat field correction values may also be determined and applied to thermal image data to further correct for such non-uniformities.

In one embodiment, an infrared camera includes a focal plane array (FPA) adapted to capture thermal image data in response to infrared radiation received by the FPA; a memory adapted to store a set of supplemental flat field correction values; and a processor adapted to: estimate a temperature difference between the FPA and a component of the infrared camera that is in proximity to a first optical path of the infrared camera, determine a scale factor from the estimated temperature difference, apply the scale factor to the set of supplemental flat field correction values, and apply the scaled set of supplemental flat field correction values to the thermal image data to adjust for non-uniformities associated with at least a portion of the first optical path.

In another embodiment, a method of processing thermal image data captured by an infrared camera includes capturing thermal image data at an FPA of the infrared camera; estimating a temperature difference between the FPA and a component of the infrared camera that is in proximity to an optical path of the infrared camera; determining a scale factor from the estimated temperature difference; applying the scale factor to a set of supplemental flat field correction values adapted to adjust for non-uniformities associated with at least a portion of the optical path; and applying the scaled set of supplemental flat field correction values to the thermal image data.

In another embodiment, a method of calibrating an infrared camera includes calibrating an FPA of the infrared camera to an external scene to determine a first set of flat field correction values associated with a first optical path from the external scene to the FPA; estimating a temperature difference between the FPA and a component of the infrared camera that is in proximity to the first optical path; determining a set of supplemental flat field correction values based on, at least in part, the first set of flat field correction values, wherein the supplemental flat field correction values are adapted to be applied to thermal image data captured by the FPA to adjust for non-uniformities associated with at least a portion of the first optical path; and storing the set of supplemental flat field correction values and the corresponding estimated temperature difference.

The scope of the invention is defined by the claims. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Figure 1:
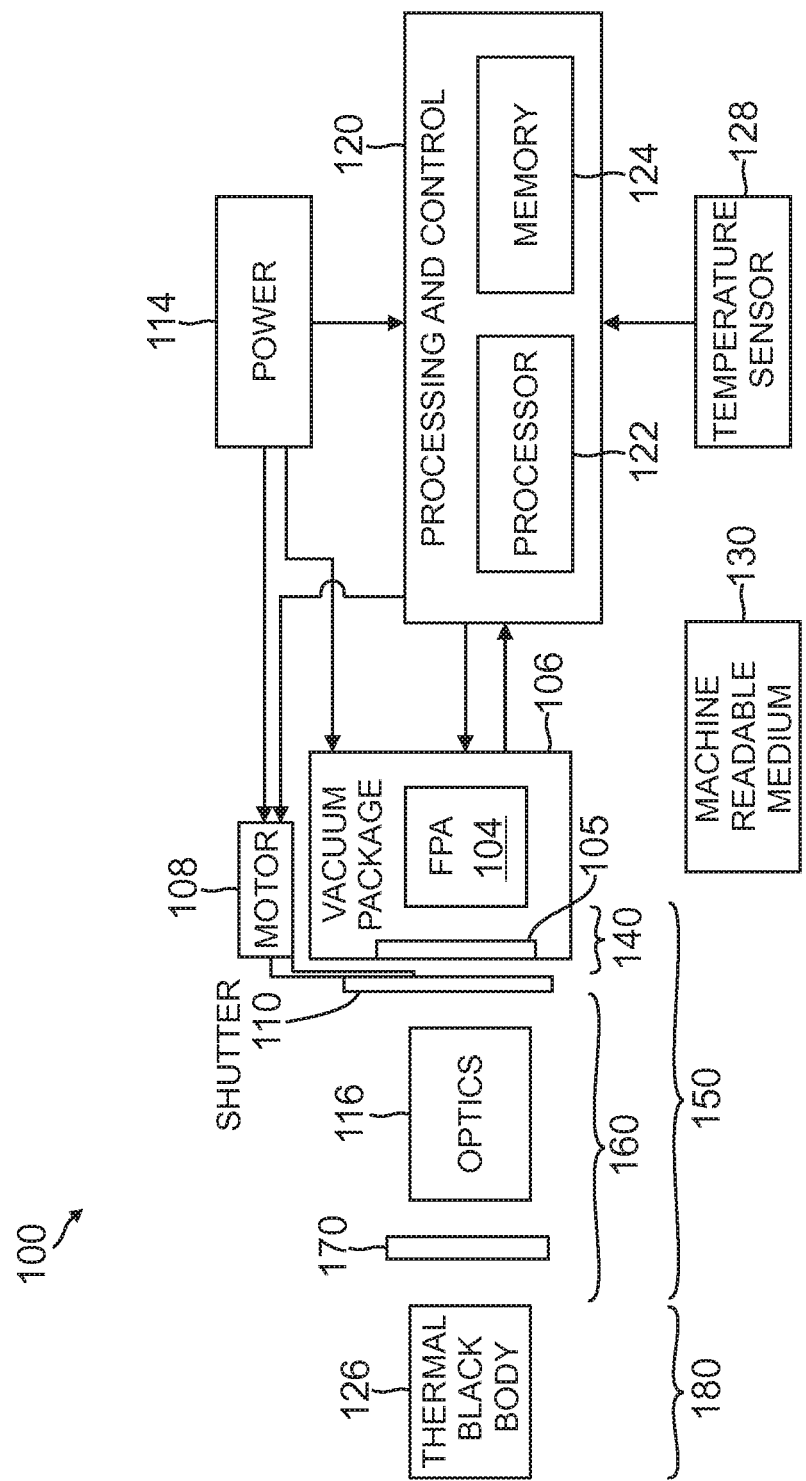
FIG. 1 illustrates an infrared camera in accordance with an embodiment of the invention.

FIG. 1 illustrates an infrared camera 100 in accordance with an embodiment of the invention. Infrared camera 100 includes an infrared detector package 106, a motor 108, a shutter 110, a power block 114, an optics block 116, a processing and control block 120, a temperature sensor 128, and an optional window 170.

In one example, infrared camera 100 may represent any type of infrared camera or thermal imaging system, is not limited to any specific embodiment disclosed herein, and may be implemented as desired for particular applications. Accordingly, in one embodiment, the components illustrated in FIG. 1 may be implemented as a standalone infrared camera. In another embodiment, the components of FIG. 1 may be distributed between a plurality of different devices. For example, processing and control block 120 may be implemented by one or more external computer systems that interface with infrared camera 100 (e.g., over a network or other appropriate communication medium). In another embodiment, infrared camera 100 may be implemented with greater, fewer, and/or different components than those illustrated in FIG. 1 as appropriate for particular applications.

Infrared energy received from a scene 180 in front of infrared camera 100 passes along an optical path 150 through optics block 116 (e.g., athermalized optics including one or more lenses for focusing infrared radiation on infrared detector package 106) to infrared detector package 106 (e.g., a vacuum package assembly). In one embodiment, infrared detector package 106 and optics block 116 may be sealed inside a chamber (not shown) including window 170 (e.g., a heated or temperature controlled protective window) positioned between optics block 116 and scene 180.

In another embodiment, one or more lenses of optics block 116 may be selectively inserted into optical path 150. Accordingly, infrared camera 110 may be operated with various lenses (e.g., 25 mm, 35 mm, 50 mm, 140 mm, or others) as may be desired for particular applications. The different types of lenses may contribute to different non-uniformities in the propagation of infrared radiation along optical path 150.

Infrared detector package 106 includes a focal plane array (FPA) 104 to detect infrared radiation passing through a window 105 and provide thermal image data in response thereto. FPA 104 may be implemented using various types of infrared detectors (e.g., quantum wells, microbolometers, or other types) as may be desired for particular implementations.

In order to calibrate FPA 104, a thermal black body 126 may be positioned in scene 180 such that thermal black body 126 fully subtends the lens field of view (FOV) of infrared camera 100. By operating infrared camera 100 in a thermally stable environment (e.g., corresponding to a thermal steady state condition such as room temperature) and capturing thermal images of thermal black body 126, flat field correction values may be determined which may be applied to thermal image data received from FPA 104 to correct for non-uniformities (e.g., thermal loading or optical irregularities) present in optical path 150.

Shutter 110 may be selectively inserted into optical path 150 through the operation of motor 108 to facilitate calibration of FPA 104. For example, in the embodiment illustrated in FIG. 1, shutter 110 is shown inserted into optical path 150. While inserted into optical path 150, shutter 110 substantially blocks infrared radiation from passing to FPA 104 from scene 180. In this case, FPA 104 instead detects infrared radiation received from shutter 110 along an optical path 140, to the exclusion of infrared radiation received along an optical path 160. In one embodiment, shutter 110 may be implemented to approximate a thermal black body in front of infrared detector package 106. By calibrating FPA 104 to shutter 110, flat field correction values may be determined which may be applied to infrared detectors of FPA 104 in order to correct for non-uniformities present in optical path 140, as discussed further herein.

Power block 114 may include a circuit board power subsystem (e.g., a power board) for infrared camera 100. For example, power block 114 may provide various power conversion operations and desired power supply voltages, power on-off switching, and various other operations (e.g., a shutter driver for motor 108), including an interface to a battery or external power supply, as would be understood by one skilled in the art.

Processing and control block 120 includes a processor 122 and a memory 124. Processor 122 may be configured with appropriate software (e.g., one or more computer programs for execution by processor 122) stored on a machine readable medium 130 (e.g., a CD-ROM or other appropriate medium) and/or in memory 124 to instruct processor 122 to perform one or more of the operations described herein. Processor 122 and memory 124 may be implemented in accordance with any desired combination of one or more processors and/or one or more memories as desired for particular implementations.

Processing and control block 120 receives thermal image data captured by infrared detectors of FPA 104 and processes the thermal image data to perform a flat field correction on the data to account for non-uniformities associated with the infrared detectors of FPA 104 and other non-uniformities associated with other portions of optical path 150 (e.g., non-uniformities associated with optics block 116 or other portions of infrared camera 100). The corrected thermal image data may be used to provide corrected thermal images which account for aberrations in optical path 150.

Processing and control block 120 also interfaces with motor 108 to control the insertion and removal of shutter 110 from optical path 150. Advantageously, processing and control block 120 may receive thermal image data captured by FPA 104 either while shutter 110 is inserted into optical path 150 or while shutter 110 is removed from optical path 150. As a result, processing and control block 120 may selectively calibrate FPA 104 along either optical path 140 (e.g., while shutter 110 is inserted in optical path 150) or optical path 150 (e.g., while shutter 110 is removed from optical path 150). For example, in one embodiment, processing and control block 120 may determine flat field correction values (e.g., gain and offset values) associated with individual infrared detectors of FPA 104 to correct for non-uniformities associated with the infrared detectors for either optical path 140 or optical path 150. As further described herein, the flat field correction values may be further processed to determine supplemental flat field correction values to correct for non-uniformities associated with the infrared detectors for optical path 160.

Processing and control block 120 also interfaces with temperature sensor 128 to determine a temperature and a rate of temperature change of the ambient environment in which infrared camera 100 is positioned and/or one or more components of infrared camera 100 (e.g., FPA 104, infrared detector package 106, motor 108, shutter 110, power block 114, optics block 116, processing and control block 120, window 170, and/or other components). Processing and control block 120 may be configured to scale the supplemental flat field correction values based on temperature readings obtained from temperature sensor 128.

Temperature sensor 128 may be positioned in any desired location of infrared camera 100 (e.g., optics block 116, FPA 104, mechanical components near optical path 150 such as shutter 110 and/or window 170, and/or other locations of infrared camera 100) and/or in the ambient environment in which infrared camera 100 is positioned. For example, in one embodiment, temperature sensor 128 is positioned on FPA 104 and window 170.

Figure 2:
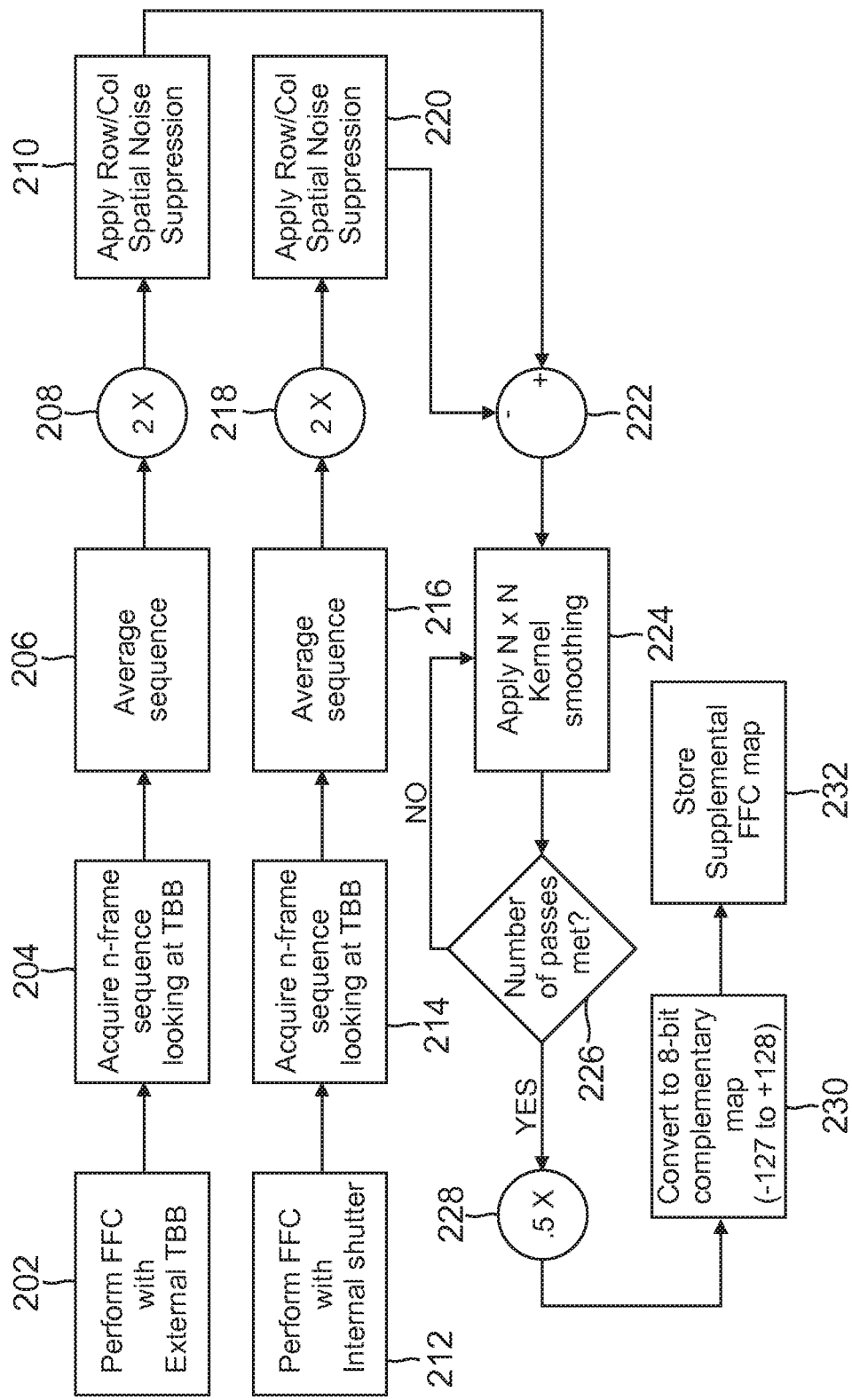
FIG. 2 illustrates a process of determining supplemental flat field correction values in accordance with an embodiment of the invention.

FIG. 2 illustrates a process of determining supplemental flat field correction values in accordance with an embodiment of the invention. In one example, the process of FIG. 2 may be performed by a provider of infrared camera 100 (e.g., a manufacturer, designer, or other party providing infrared camera 100). In this example, supplemental flat field correction values may be prepared by the provider and stored by infrared camera 100 to be subsequently used during operation of infrared camera 100 by a user. In another example, the process of FIG. 2 may be performed by a user of infrared camera 100. In yet another example, performance of the process of FIG. 2 may be distributed between a provider of infrared camera 100 and a user of infrared camera 100.

In steps 202 through 210, flat field correction values are determined for the infrared detectors of FPA 104 to correct for non-uniformities in optical path 150. In steps 212 through 220, flat field correction values are determined for the infrared detectors of FPA 104 to correct for non-uniformities in optical path 140. In steps 222 through 232, the flat field correction values associated with optical path 140 are subtracted from those associated with optical path 150 and the resulting supplemental flat field correction values are further processed. These supplemental flat field correction values may be applied to thermal image data obtained during subsequent operation of infrared camera 100.

Advantageously, the supplemental flat field correction values may be used to correct for non-uniformities associated with optical path 160 (e.g., the portion of optical path 150 external to shutter 110 and infrared detector package 106) that would not otherwise be correctable using only flat field correction values associated with optical path 140. Such non-uniformities may be attributable to, for example, window 170, optics block 116, mounting hardware of infrared camera 100, or other components of infrared camera 100. Also, the use of supplemental flat field correction values may reduce the effects of imperfections in window 105 (e.g., crop circles), FPA 104 (e.g., botches or tilted pixels), or shutter 110 (e.g., imperfections in the thermal black body presented by shutter 110 to FPA 104 (e.g., due to non-uniform temperature or heating of shutter 110)).

In one embodiment, the process of FIG. 2 may be performed while infrared camera 100 and the surrounding ambient environment are under thermally stable conditions at room temperature (e.g., in a temperature-controlled chamber) while infrared camera 100 is in a final configuration to be used for capturing thermal image data during normal operation of infrared camera 100. For example, in this embodiment, all mechanical and thermal components of infrared camera 100 (e.g., lenses of optics block 116, mounting hardware, and other components of infrared camera 100) may be mounted and powered on for at least ten minutes or until temperature sensor 128 indicates insignificant changes in temperature before the process of FIG. 2 is performed.

In another embodiment, the process of FIG. 2 may be repeated for different temperatures of the surrounding ambient environment and/or components of infrared camera 100. As a result, different supplemental flat field correction values may be determined for different temperatures.

In another embodiment, the process of FIG. 2 may be repeated for different configurations of infrared camera 100. For example, in different iterations of the process of FIG. 2, infrared camera 100 may be powered on and configured for capturing thermal images with different lenses in optics block 116 (e.g., different sizes of lenses or lenses provided by different manufacturers), different mounting hardware, and/or other components. As a result, different supplemental flat field correction values may be determined for different configurations of infrared camera 100, or different types of infrared cameras 100.

Calculations described herein with regard to the process of FIG. 2 may be performed in a localized or distributed manner as may be desired in particular applications. For example, in one embodiment, the calculations may be performed locally by infrared camera 100 (e.g., where processing and control block 120 is implemented as part of infrared camera 100). In another embodiment, the calculations may be performed by one or more external computer systems that interface with infrared camera 100 (e.g., where processing and control block 120 is implemented by such computer systems). In yet another embodiment, the calculations may be performed locally by infrared camera 100 and one or more external computer systems that interface with infrared camera 100 (e.g., where processing and control block 120 is implemented as part of infrared camera 100 and is also implemented by such computer systems).

Referring now to the particular steps in the process of FIG. 2, in step 202, infrared camera 100 begins performing a flat field correction (FFC) process for FPA 104 using thermal black body (TBB) 126 which is external to infrared camera 100. Accordingly, during step 202, processing and control block 120 controls motor 108 to remove shutter 110 from optical path 150.

In step 204, FPA 104 captures (e.g., acquires) two or more frames of thermal image data corresponding to infrared radiation received along optical path 150. For example, in one embodiment, FPA 104 captures eight frames of thermal image data which is passed to processing and control block 120.

In step 206, processing and control block 120 averages the thermal image data over the two or more frames received from FPA 104 to average out differences in the captured image values from frame to frame. In one embodiment, the value of each pixel is averaged for all values of the same pixel in the frame sequence captured in previous step 204. For example, if eight frames of thermal image data are captured in previous step 204, then the average value of each pixel is determined based on the eight values for the pixel captured in the eight frames of thermal image data.

Also in step 206, when determining the average value of each pixel, processing and control block 120 may chose to ignore one or more pixel values from one or more frames that fall outside a selected range when compared to the same pixels of the other captured frames. For example, if eight frames are captured in step 204, and if a particular pixel of one of the frames has a value that significantly differs from values associated with corresponding pixels of the remaining seven frames, then the pixel value of the one frame may skew the average pixel value determined for the eight frames. Accordingly, processing and control block 120 may choose to ignore the pixel value of the one frame and instead determine an average pixel value over the remaining seven frames. As a result, the accuracy of the thermal image data provided in step 206 can be improved.

In optional step 208, the pixel values are multiplied by a factor of two for convenient computation by processing and control block 120. In optional step 210, processing and control block 120 applies row and column spatial noise suppression to the multiplied average pixel values based on conventional processing techniques as would be understood by one skilled in the art.

Following the completion of step 210, flat field correction values will have been determined for all infrared detectors of FPA 104. In this embodiment, any infrared radiation detected by FPA during steps 202 to 210 includes non-uniformities associated with infrared detectors of FPA 104, optics block 116, or other components of infrared camera 100 which may contribute infrared radiation along optical path 150. Accordingly, differences in thermal data obtained during steps 202 to 210 correspond to the composite effect of all non-uniformities along optical path 150. Processing and control block 120 uses these data values to determine a flat field correction value for each pixel that results in a thermally calibrated data value for the pixel when the flat field correction value is applied to a thermal image captured along optical path 150 while thermal black body 126 is in place and shutter 110 is removed from optical path 150 (e.g., for a given calibrated temperature).

In step 212, infrared camera 100 begins performing a flat field correction of FPA 104 using shutter 110 as a thermal black body which is internal to infrared camera 100. Accordingly, during step 212, processing and control block 120 controls motor 108 to insert shutter 110 into optical path 150. As a result, FPA 104 is configured to receive infrared radiation along only optical path 140 (i.e., not the entire optical path 150).

Steps 214 through 220 are performed for optical path 140 in substantially the same manner as described above for steps 204 through 210 for optical path 150. Accordingly, following the completion of step 220, another set of flat field correction values will have been determined for all infrared detectors of FPA 104. In this embodiment, any infrared radiation detected by FPA during steps 212 to 220 includes non-uniformities associated with shutter 110, infrared detectors of FPA 104, and/or other components of infrared camera 100 which may contribute infrared radiation along optical path 140. Accordingly, any differences in thermal data obtained during steps 212 to 220 correspond to the composite effect of all non-uniformities along optical path 140. Processing and control block 120 uses these data values to determine a flat field correction value for each pixel that results in a thermally calibrated data value for the pixel when the flat field correction value is applied to a thermal image captured along optical path 140 while shutter 110 is inserted into optical path 150.

In step 222, processing and control block 120 subtracts flat field correction values associated with optical path 140 from those associated with optical path 150 to obtain a supplemental flat field correction value for each pixel (i.e., infrared detector) of FPA 104.

In steps 224 through 232, processing and control block 120 further processes the supplemental flat field correction values. For example, in step 224, processing and control block 120 applies kernel smoothing to the supplemental flat field correction values to minimize high-frequency noise in the previously acquired image data. The kernel smoothing of step 224 may be applied using any desired density (e.g., 3 by 3 pixels or other densities). This kernel smoothing may be repeated any desired number of times (step 226). In one embodiment, step 224 may be performed in accordance with the process of FIG. 3 or may be performed using conventional techniques as would be understood by one skilled in the art.

In one embodiment, processing and control block 120 may be configured to process only positive (e.g., zero or greater) supplemental flat field correction values during the kernel smoothing of step 224. In this embodiment, the supplemental flat field correction values may be offset by a desired positive number (e.g., an offset value of 1000) before step 224 is performed, which is then subtracted from the kernel smoothed field correction values after steps 224 and 226 are performed.

Although steps 224 and 226 have been described with regard to kernel smoothing techniques, other techniques may be used to smooth or otherwise reduce the differences between individual pixel values of the supplemental flat field correction values. Such techniques may include, for example, high frequency noise suppression techniques, pixel value blurring techniques, and/or other appropriate techniques as will be appreciated by one skilled in the art.

In optional step 228, processing and control block 120 divides the supplemental flat field correction values by a factor of two (e.g., if optional steps 208 and 218 were previously performed).

In step 230, processing and control block 120 scales the supplemental flat field correction values to an eight bit resolution corresponding to a range from −127 to 128 (e.g., using seven data bits and one sign bit). In this regard, an eight bit resolution may permit efficient usage of memory 124 during the processing of the supplemental flat field correction values while still providing sufficient resolution to adjust for non-uniformities present in thermal image data. In one embodiment, the flat field correction values associated with optical paths 140 and 150 determined in steps 202 to 220, as well as the supplemental flat field correction values determined in step 222, may have a fourteen bit resolution (e.g., corresponding to the resolution of individual infrared detectors of FPA 104). In this embodiment, the supplemental flat field correction values are scaled to a resolution of eight bits in step 230 as would be understood by one skilled in the art. In other embodiments, such as where larger adjustments are desired, higher bit resolutions may be used for the supplemental flat field correction values.

In step 232, the smoothed, scaled supplemental flat field correction values are stored as a supplemental flat field correction map which may be applied to thermal image data obtained during subsequent operation of infrared camera 100 to adjust for non-uniformities in optical path 160 (e.g., corresponding to the difference between optical path 150 and optical path 140).

Figure 3:
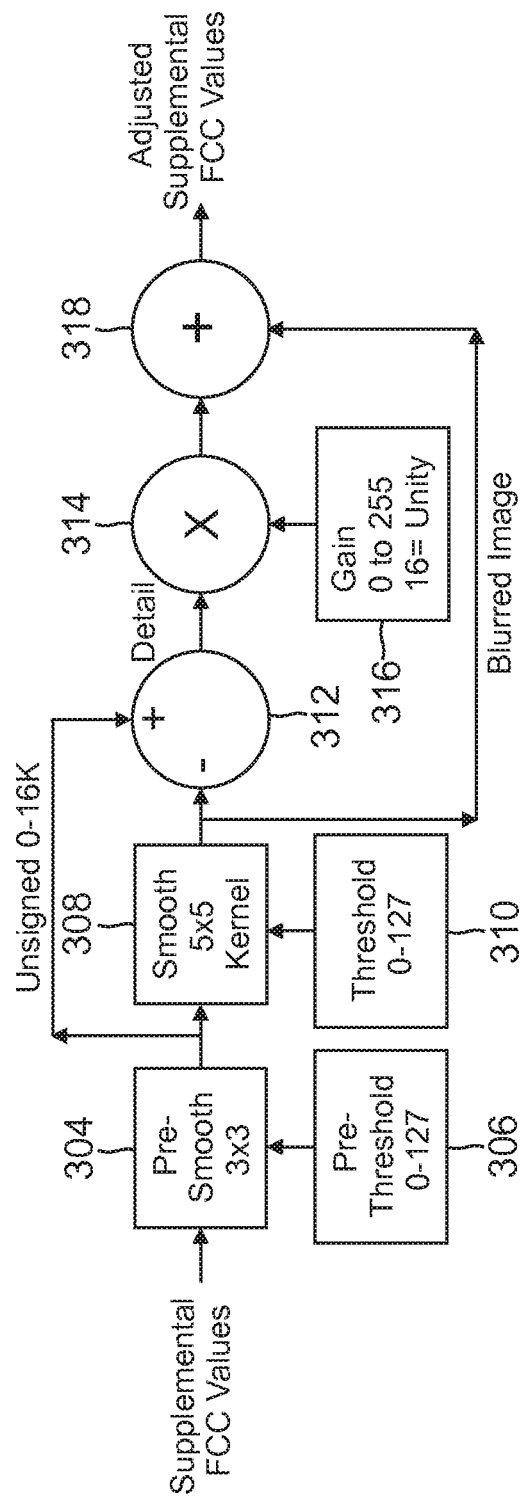
FIG. 3 illustrates a process of adjusting supplemental flat field correction values in accordance with an embodiment of the invention.

FIG. 3 illustrates a process of adjusting supplemental flat field correction values in accordance with an embodiment of the invention. For example, in one embodiment, the process of FIG. 3 may be performed by processing and control block 120 during step 224 of FIG. 2.

In step 304, processing and control block 120 performs a kernel smoothing on three by three pixel groups of the supplemental flat field correction values that were stored in step 232 of FIG. 2. A threshold value used to perform the kernel smoothing of step 304 is selected from a range of 0 to 127 (identified in step 306). As similarly discussed above with regard to steps 224 and 226, other techniques may be used in step 304 to smooth or otherwise reduce the differences between individual pixel values of the supplemental flat field correction values.

In step 308, processing and control block 120 performs a kernel smoothing on five by five pixel groups of the previously-smoothed supplemental flat field correction values. A threshold value used to perform the kernel smoothing of step 308 is selected from a range of 0 to 127 (identified in step 310). As similarly discussed above with regard to steps 224, 226, and 304, other techniques may be used in step 308 to smooth or otherwise reduce the differences between individual pixel values of the supplemental flat field correction values.

In step 312, the twice-smoothed supplemental flat field correction values determined in step 308 are subtracted from the once-smoothed supplemental flat field correction values determined in step 304. In step 314, a gain factor (identified in step 316) is applied to the difference values determined in step 312. In step 318, the gain-adjusted difference values (determined in step 314) are added to the twice-smoothed supplemental flat field correction values (determined in step 308) to provide adjusted supplemental flat field correction values.

Figure 4:
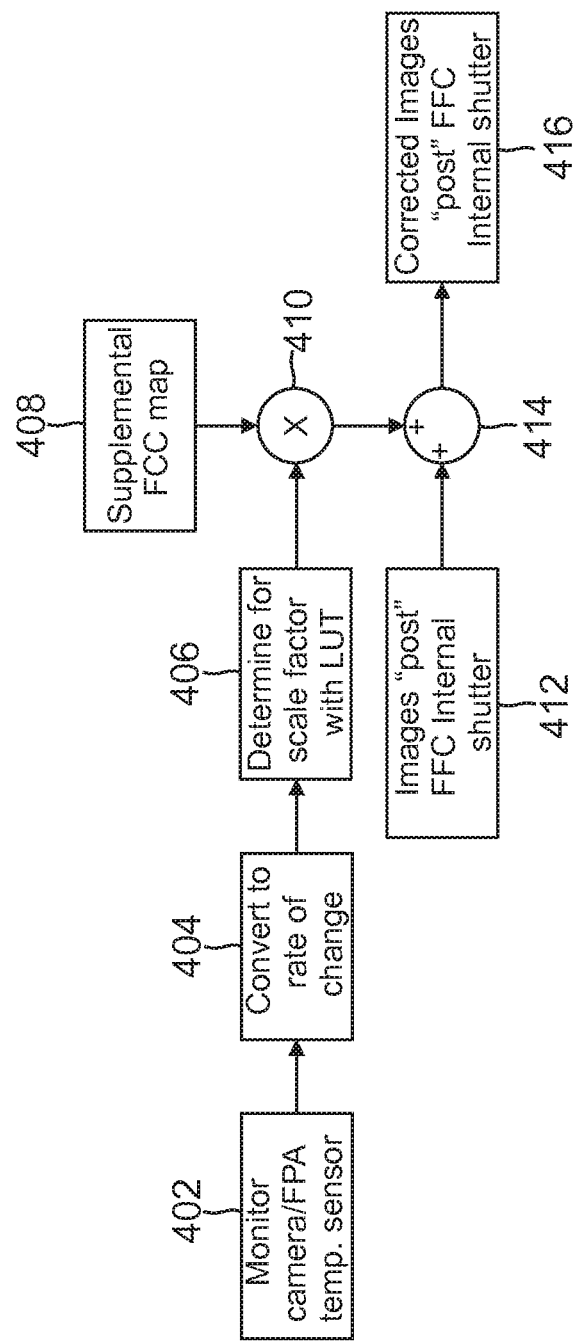
FIG. 4 illustrates a process of performing flat field correction in accordance with an embodiment of the invention.

FIG. 4 illustrates a process of performing flat field correction in accordance with an embodiment of the invention. For example, in one embodiment, the process of FIG. 4 may be performed by processing and control block 120 following the process of FIG. 2.

In step 402, processing and control block 120 monitors temperature sensor 128 and obtains temperature data for the components of infrared camera 100 and/or the ambient environment in which infrared camera 100 is positioned. In step 404, processing and control block 120 processes the temperature data to determine a rate of temperature change. For example, in one embodiment, the rate of temperature change may be integrated over a five second period of time to smooth out high frequency noise.

In step 406, processing and control block 120 determines a scale factor associated with the rate of temperature change determined in step 404. The scale factors may be used to adjust the amount of supplemental flat field correction applied to thermal image data in realtime during operation of infrared camera 100. For example, the following Table 1 identifies various scale factors which may be applied to the supplemental flat field correction values for different rates of temperature change:

TABLE 1

| Scale factor applied to supplemental flat field correction values | Temperature rate of change in degrees Celsius for five second period |
|---|---|
| 0.00 | 29 < temperature rate of change |
| 0.25 | 23 < temperature rate of change ≤ 29 |
| 0.50 | 15 < temperature rate of change ≤ 23 |
| 0.75 | 5 < temperature rate of change ≤ 15 |
| 1.00 | temperature rate of change ≤ 5 |

In step 408, appropriate supplemental flat field correction values are provided from memory 124. In one embodiment, the supplemental flat field correction values provided in step 408 are selected from a plurality of different sets of supplemental flat field correction values corresponding to different configurations of infrared camera 100. For example, as previously described, the process of FIG. 2 may be repeated for different infrared cameras 100 or different configurations of infrared camera 100 to store different sets of supplemental flat field correction values corresponding to various configurations of optics block 116, mounting hardware, and/or other components of infrared camera 100. Accordingly, in step 408, the supplemental flat field correction values corresponding to the current infrared camera 100 or current configuration of infrared camera 100 are selected.

In step 410, the supplemental flat field correction values (e.g., provided from memory 124 in step 408) are scaled (e.g., multiplied) by the scale factor determined in step 406. For example, as shown in Table 1, if the temperature rate of change is relatively stable (e.g., changing between zero and five degrees within a five second period), then a scale factor of 1.0 will be determined in step 406 and applied in step 410.

In contrast, if the temperature rate of change is relatively unstable (e.g., changing more than 29 degrees within a five second period), then a scale factor of zero will be determined in step 406 and applied in step 410. In this case, the supplemental flat field correction values will not be applied to thermal image data.

Other scale factors (e.g., 0.25, 0.50, or 0.75) may be determined and applied for other temperature rates of change as set forth in Table 1. Moreover, although particular scale factors and temperature rates of change are identified in Table 1, other scale factors and temperature rates of change are contemplated. In particular, the scale factors and temperature rates of change identified in Table 1 are dependant on the particular optical path 150 of infrared camera 100 and the desired amount of supplemental flat field correction that may be desired in particular applications. For example, in another embodiment, scale factors having increments of 0.1 may be used.

In step 412, processing and control block 120 applies the flat field correction values determined by steps 212 to 220 of FIG. 2 (e.g., determined for optical path 140 with shutter 110 inserted into optical path 150) to infrared detectors of FPA 104 to provide thermal image data that accounts for non-uniformities in optical path 140.

In step 414, processing and control block 120 also applies the scaled supplemental flat field correction values determined in step 410 to the thermal image data to account for non-uniformities in optical path 160. As a result, processing and control block 120 provides corrected thermal image data in step 416 which has been processed to account for non-uniformities along the full optical path 150 (e.g., corresponding to optical paths 140 and 160 together). Thus, by using supplemental flat field correction values determined for particular configurations of infrared camera 100, non-uniformities attributable to such configurations may be corrected.

Although only a single set of supplemental flat field correction values are identified in FIG. 4, it is contemplated that different sets of supplemental flat field correction values may be used depending on the particular infrared camera 100 used, the configuration of infrared camera 100, and/or detected temperatures or rates of temperature change. For example, in one embodiment, processing and control block 120 may be configured to extrapolate a single set of supplemental flat field correction values depending on detected temperatures or rates of temperature changes. In another embodiment, processing and control block 120 may be configured to select different sets of supplemental flat field correction values, or extrapolate between such values, depending on detected temperatures or rates of temperature changes. In yet another embodiment, such selections or extrapolations may be performed based on the particular infrared camera 100 used or the configuration of infrared camera 100.

Advantageously, the supplemental flat field correction values as described herein can be applied to thermal image data captured by FPA 104 to compensate for non-uniformities that may otherwise remain uncorrected by conventional shutter-based infrared detector calibrations. Such non-uniformities include, for example, image artifacts of infrared detectors of FPA 104 (e.g., botches or tilted pixels), image artifacts of window 105 (e.g., crop circles), and non-uniformities in the thermal black body provided by shutter 110 (e.g., caused by non-uniform internal heating).

Also, the use of supplemental flat field correction values can provide more accurate thermal image data which consequently reduces the frequency at which FPA 104 is recalibrated to the thermal black body provided by shutter 110. As a result, shutter 110 and motor 108 may be used less frequently which may improve their reliability.

In one embodiment, the use of supplemental flat field correction values may be selectively enabled or disabled as may be desired in particular applications. For example, in one embodiment, a user may selectively enable or disable the use of supplemental flat field correction values by interacting with a graphic user interface provided by infrared camera 100 or specifying a dynamic header of a graphical user interface (GUI) as will be understood by those skilled in the art. In another example, a provider of infrared camera 100 may specify default conditions to enable or disable the use of supplemental flat field correction values.

As noted above in connection with steps 224 and 226 of FIG. 2, other techniques may be used to smooth or otherwise reduce the differences between individual pixel values of a set of supplemental flat field correction values. In some embodiments, step 224 may be implemented as a median low-pass filter having a variety of different window sizes and/or patterns. For example, in one embodiment, step 224 may be implemented as a two-dimensional "cross" median low-pass filter (e.g., with a "cross" window pattern) of varying window size.

In other embodiments, where step 224 is applied multiple times through use of step 226, for example, step 224 may be implemented as a three-dimensional "cross", "box", or other window pattern median low-pass filter of varying window size. In such embodiments, a maximum window size in a third dimension may approximate the number of passes performed according to step 226, for example. In further embodiments, step 224 may be implemented as a variety of smoothing filters (e.g., N×N kernel smoothing filters, median low-pass filters, and/or other smoothing filters) that are applied sequentially as the number of passes increments. Similarly, steps 304 and/or 308 of FIG. 3 may also be implemented as other types of smoothing filters. For example, in some embodiments, steps 304 and 308 may be implemented as two-dimensional median filters (e.g., having the same or different window patterns), where the window size of step 304 is smaller than the window size of step 308.

As noted above in connection with step 230, step 230 may be adapted to scale supplemental flat field correction values to higher bit resolutions (e.g., higher than 8-bit resolutions) in preparation for storage, for example. In some embodiments, where the flat field correction values may have a 14-bit resolution, for example, step 230 may be adapted to scale corresponding supplemental flat field correction values to a 14-bit or higher resolution, for example, and using a complementary or non-complementary bit structure.

Figure 5:
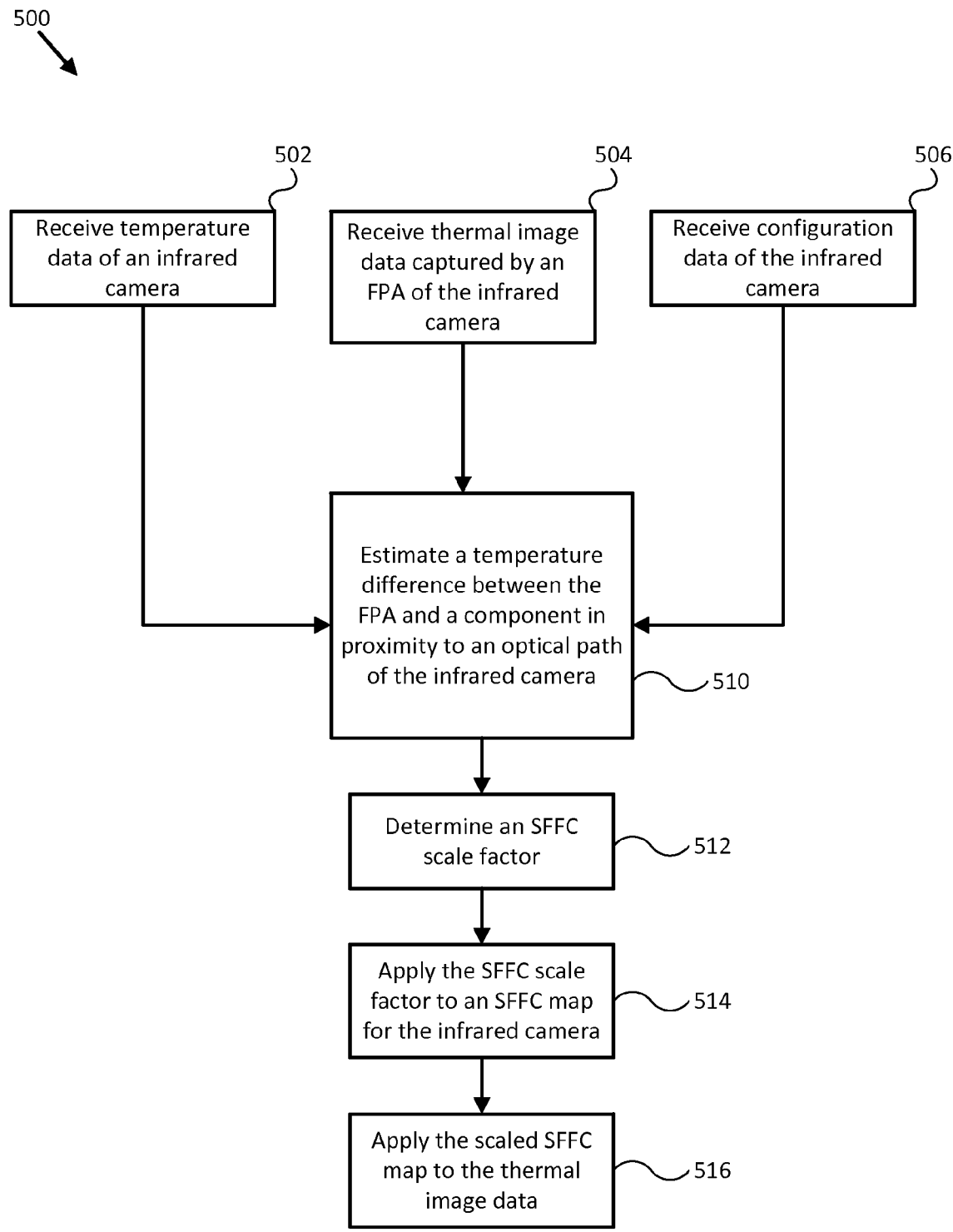
FIG. 5 illustrates a process of performing flat field correction in accordance with an embodiment of the invention.

FIG. 5 illustrates a process 500 of performing flat field correction in accordance with an embodiment of the invention. For example, in one embodiment, the process of FIG. 5 may be performed by processing and control block 120 following the process of FIG. 2, for example, or following performance of a subset of the process of FIG. 2. In some embodiments, processing and control block 120 may be configured to store outputs of a step and/or block to memory 124 during and/or after processing of the step and/or block.

It should be appreciated that any step, sub-step, sub-process, or block of process 500 may be performed in an order or arrangement different from the embodiment illustrated by FIG. 5. For example, although process 500 includes blocks 502, 504, and 506, in other embodiments, only one or two of blocks 502, 504, and 506 may be present. In various embodiments, process 500 may include various aspects of the process of FIG. 2, the process of FIG. 3, and/or the process of FIG. 4.

For example, in some embodiments, steps 212-220 of the process of FIG. 2 may not be performed. In such embodiments, flat field correction values associated with path 140 may all be set to the same value, such as zero, for example, such that the supplemental flat field correction values obtained through step 222 are substantially equal to the flat field correction values associated with optical path 150. Furthermore, as noted previously, the process of FIG. 2 may be repeated for different temperatures of the surrounding ambient environment and/or components of infrared camera 100, and so different supplemental flat field correction values (e.g., substantially equal to the flat field correction values associated with optical path 150), may be determined for a variety of different temperatures. In some embodiments, a configuration of infrared camera 100 may be adjusted iteratively (e.g., through a series of configurations and/or over a pre-determined period of time and/or temperatures), and one or more calibration processes, temperature sensor reading processes, temperature difference estimation processes, supplemental flat field correction value determining processes, and/or storage processes (e.g., of supplemental flat field correction values, temperatures, and/or temperature differences to memory 124) may be performed, for example.

In optional block 502, processing and control block 120 receives temperature data of infrared camera 100. For example, processing and control block 120 may be adapted to monitor temperature sensor 128 and receive temperature data for one or more components of infrared camera 100 and/or the ambient environment in which infrared camera 100 is positioned. In some embodiments, processing and control block 120 may be adapted to recognize inaccurate temperature data of a component resulting from, for example, an inoperative or malfunctioning temperature sensor 128. In such embodiments, processing and control block 120 may be adapted to store configuration data in memory 124 indicating the inaccurate temperature data for the particular component.

In optional block 504, processing and control block 120 receives thermal image data of infrared camera 100. For example, processing and control block 120 may be adapted to monitor FPA 104 and receive thermal image data captured by FPA 104. In some embodiments, the thermal image data received by processing and control block 120 may be thermal image data at least partially corrected by flat field correction values associated with, for example, optical path 140 and/or one or more of steps 212 through 220 of the process of FIG. 2. In other embodiments, the thermal image data received by processing and control block 120 may be raw and/or uncorrected thermal image data.

In optional block 506, processing and control block 120 receives configuration data of infrared camera 100. For example, processing and control block 120 may be adapted to monitor one or more components of infrared camera 100, including memory 124, and receive configuration data corresponding to a current and/or past state of one or more of the components of infrared camera 100. For example, in embodiments where window 170 is implemented as a heated or temperature controlled protective window (e.g., with one or more heaters powered by power block 114), processing and control block 120 may be adapted to monitor a power supplied to heated window 170 over time, store such configuration data to memory 124, and/or receive such configuration data (e.g., from power block 114, memory 124, and/or window 170). In like manner, processing and control block 120 may be adapted to monitor and receive configuration data corresponding to a variety of configurations of infrared camera 100, such as power levels of various heaters (e.g., de-icing heaters) coupled to one or more components (e.g., window 105, optics block 116, window 170) of infrared camera 100, selection and/or activation of a particular lens or other optical elements of optics block 115, activation times and/or activation durations of shutter 110 by motor 108, and/or other configurations and/or configuration data of infrared camera 100.

In block 510, processing and control block 120 estimates a temperature difference between FPA 104 and at least one component in proximity to an optical path of infrared camera 100. For example, processing and control block 120 may be adapted to estimate a temperature difference between FPA 104 and any of the components in proximity to optical path 150, such as window 105, shutter 110, optics block 116, window 170, and/or other components of infrared camera 100, including housings for any of FPA 104, window 105, shutter 110, optics block 116, and/or window 170.

In one embodiment, processing and control block 120 may be adapted to determine the estimated temperature difference based on temperature data received in block 502. For example, temperature sensor 128 may be adapted to measure a temperature of a housing of shutter 110 and infrared detector package 106. In such embodiment, processing and control block 120 may be adapted to determine an estimated temperature difference between shutter 110 and FPA 104 by taking the difference between the measured temperatures of the housing of shutter 110 and of infrared detector package 106.

In embodiments where temperature sensor 128 is in thermal equilibrium with FPA 104 and a component of infrared camera 100, the estimated temperature difference may be substantially equal to the actual temperature difference. In embodiments where temperature sensor 128 is not in thermal equilibrium with FPA 104 and a component of infrared camera 100, the estimated temperature difference may be different from the actual temperature difference, for example, and/or may be determined from the measured temperature difference according to known thermal conductivities of components of infrared camera 100 and/or other temperatures measured by temperature sensor 128. Furthermore, the estimated temperature difference may be determined, adjusted, and/or refined from the measured temperature difference according to received image data and/or configuration data, as described herein.

In another embodiment, processing and control block 120 may be adapted to determine the estimated temperature difference based on available temperature data for FPA 104 or a component of infrared camera 100 (e.g., received in block 502), thermal image data received in block 504, and/or configuration data received in block 506. For example, temperature sensor 128 may be malfunctioning or otherwise configured such that only temperature data for FPA 104 or another component of infrared camera 100 is available. In such embodiments, processing and control block 120 may be adapted to use received thermal image data and/or configuration data to predict, estimate, or otherwise determine the unavailable temperature data and/or an estimated temperature difference.

For example, during a calibration of infrared camera 100, temperature data for components of infrared camera 100 may be measured over time from initialization (e.g., from startup) through an approximate thermal equilibrium time, and stored as configuration data in memory 104. Processing and control block 120 may be adapted to determine unavailable temperature data and/or an estimated temperature difference by comparing the time since infrared camera 100 was last initialized to the corresponding configuration data (e.g., a previously determined initialization-thermal equilibrium curve, which may be received in block 506), for example.

In other embodiments, a variety of sets of flat field correction values associated with optical path 140 and/or 150 may be determined as a function of temperature data for FPA 104 and/or one or more other components of infrared camera 100, and those sets of correction values and corresponding temperature data may be stored as configuration data in memory 124 (e.g., during a calibration of infrared camera 100). Processing and control block 120 may be adapted to determine unavailable temperature data and/or an estimated temperature difference by comparing available temperature data and/or received thermal image data (e.g., corresponding to optical paths 140 and/or 150, which may be received in block 504) to the corresponding configuration data (e.g., previously determined sets of flat field correction values associated with optical path 140 and/or 150, and/or temperature data for infrared camera 100), for example. In one embodiment, processing and control block 120 may be adapted to select one or more sets of flat field correction values (e.g., and corresponding temperature data) substantially approximating a pattern of non-uniformities present in the received thermal image data. Processing and control block 120 may be adapted to perform one or more pattern recognition and/or matching processes to select the one or more sets of flat field correction values.

In a further embodiment, temperature data for FPA 104 and/or one or more other components of infrared camera 100 may be determined as a function of a configuration of infrared camera 100, and be stored as configuration data in memory 124 (e.g., during a calibration of infrared camera 100). For example, temperature data for FPA 104 and/or one or more other components of infrared camera 100 may be measured, calculated, and/or estimated as a function of heater power and/or duration (e.g., transient and/or steady state), activation time and/or activation duration of shutter 110 by motor 108, selection of a particular lens or other optical element of optics block 116, and/or other configurations of infrared camera 100. Processing and control block 120 may be adapted to determine unavailable temperature data and/or an estimated temperature difference by comparing available temperature data and/or present configuration data (e.g., received in block 506) to corresponding stored configuration data (e.g., a previously determined table and/or time-plot of temperatures as a function of configuration of infrared camera 100, which may also be received in block 506), for example.

In embodiments where shutter 110 is implemented as a plastic shutter, out-of-field infrared radiation may primarily come from a housing of shutter 110 and not from optics block 116. Thus, temperature data from FPA 104 and optics block 116 may be insufficient to accurately characterize non-uniformities due to out-of-field infrared radiation. This circumstance may be exacerbated where motor 108 of shutter 110 is implemented as a relatively high-power solenoid, which can generate more heat and dissipate heat more slowly than, for example, a direct-current motor, particularly when activated multiple times within a relatively short period of time. Thus, in some embodiments, configuration data including information of activation time and/or activation duration of shutter 110 by motor 108 can be used to substantially increase the accuracy of determined temperature data and/or an estimated temperature difference. The increased accuracy of the temperature data and/or temperature difference increases the accuracy of the resulting scaled supplemental flat field correction values, as described herein.

In various embodiments, where temperature data is available for both FPA 104 and one or more components of infrared camera 100, processing and control block 120 may be adapted to adjust and/or refine an estimated temperature difference (e.g., derived from the available temperature data) through use of received thermal image data and/or configuration data, using any of the processes described herein. In further embodiments, where no temperature data is available for either FPA 104 or one or more of the components of infrared camera 100, processing and control block 120 may be adapted to determine unavailable temperature data and/or an estimated temperature difference entirely from thermal image data received in block 504 and/or configuration data received in block 506, as described herein. According to some embodiments, processing and control block 120 may be adapted to determine unavailable temperature data and/or an estimated temperature difference through interpolation and/or extrapolation of infrared image data and/or configuration data.

In block 512, processing and control block 120 determines a supplemental flat field correction scale factor. For example, processing and control block 120 may be adapted to determine a scale factor from the estimated temperature difference determined in block 510. Similar to step 406 of the process of FIG. 4, the scale factor may be used to adjust the amount of supplemental flat field correction applied to thermal image data in real time during operation of infrared camera 100. In some embodiments, various scale factors (e.g., values of scale factors and/or forms of scale factors) may be identified by one or more tables, similar to table 1, but where the scale factors are referenced to, for example, ranges of temperature differences (e.g., between FPA 104 and a component of infrared camera 100) and/or temperature differences between specific components of infrared camera 100. Such tables may be stored as configuration data in memory 124, for example.

In other embodiments, a scale factor may be calculated from the estimated temperature difference according to a function $F(\Delta T)$ of the estimated temperature difference $\Delta T$, where $F(\Delta T)$ may be implemented as a polynomial of finite degree N and with N coefficients. In some embodiments, one or more of the N coefficients of $F(\Delta T)$ may be determined as part of a calibration process, such as one or more iterations of at least a subset of steps 202 through 232 of the process of FIG. 2. In one embodiment, the function $F(\Delta T)$ may be implemented as a polynomial of degree 1, where the coefficient for the zero degree is zero (e.g., where $F(\Delta T)=s*\Delta T+0$, for example, and "s" is determined through a calibration process). In a related embodiment, the coefficient "s" may be selected such that $s*\Delta T$ is approximately equal to 1 when $\Delta T$ reaches a steady state value. A steady state value for $\Delta T$ may be an estimated temperature difference determined after infrared camera 100 has been powered for a relatively long period of time (e.g., at least ten minutes) in a thermally stable environment, after an estimated temperature difference does not change appreciably over a period of time, or during a calibration process for infrared camera 100, for example, as described herein.

In related embodiments, one or more of the N coefficients of $F(\Delta T)$ may be dependent on a position of a pixel corresponding to a specific supplemental flat field correction value (e.g., a position of a pixel in a thermal image captured by FPA 104). Thus, in some embodiments, a scale factor may be implemented as a scale factor map including multiplicative and/or additive terms configured to compensate, at least in part, for different temperatures and/or configurations of infrared camera 100. For example, such different temperatures and/or configurations may be related to heating due to activation of shutter motor 108, for instance, and/or activation of a heater of window 105 and/or 170. In addition, regardless of whether the scale factors are retrieved from a table or calculated from a function, the scale factors may vary from negative values to values greater than 1 (e.g., through extrapolation) to compensate, at least in part, for various configurations of infrared camera 100, as described herein.

In further embodiments, a scale factor may be implemented as a function $G(sFFC_{i,j})$ of the supplemental flat field correction values (e.g., as compared to a simple multiplicative factor), such that application of the scale factor to a supplemental flat field correction map for infrared camera 100 includes multiplicative and/or additive factors to the individual supplemental flat field correction values of the set and/or map. For example, $G(sFFC_{i,j})$ (e.g., where $sFFC_{i,j}$ is the supplemental flat field correction value at a matrix position i, j in a set of supplemental flat field correction values) may be implemented as a polynomial of finite degree M and with M coefficients.

In some embodiments, one or more of the M coefficients of $G(sFFC_{i,j})$ may be determined as part of a calibration process, such as one or more iterations of at least a subset of steps 202 through 232 of the process of FIG. 2. In one embodiment, the function $G(sFFC_{i,j})$ may be implemented as a polynomial of degree 1, where the coefficients for the first and zero degree terms (e.g., "m" and "b", where $G(sFFC_{i,j})=m*sFFC_{i,j}+b$, for example) are determined through calibration of infrared camera 100 according to various configurations of infrared camera 100, as described herein.

In various embodiments, one or more of the M coefficients of G(sFFC$_{i,j}$) may individually be implemented as functions of the estimated temperature difference ΔT (e.g., "m(ΔT)" and/or "b(ΔT)", similar to F(ΔT), herein), where coefficients of the functions may be determined through one or more calibrations of infrared camera 100. Furthermore, one or more of the M coefficients of G(sFFC$_{i,j}$) may be dependent on a position of a pixel corresponding to a specific supplemental flat field correction value (e.g., a matrix position i, j in a set of supplemental flat field correction values). Thus, in some embodiments, a scale factor may be implemented as a scale factor map of functions (e.g., embodiments of G(sFFC$_{i,j}$), with coefficients dependent on ΔT, for example) including multiplicative and/or additive terms configured to compensate, at least in part, for different temperatures and/or configurations of infrared camera 100, as described herein.

In block 514, processing and control block 120 applies a supplemental flat field correction scale factor to a supplemental flat field correction map for infrared camera 100. For example, processing and control block 120 may be adapted to apply a scale factor, determined according to block 512, to a set of supplemental flat field correction values for infrared camera 100.

Similar to step 408 of the process of FIG. 4, appropriate supplemental flat field correction values may be retrieved and/or provided from memory 124. In one embodiment, the set of supplemental flat field correction values may be selected from a plurality of different sets of supplemental flat field correction values corresponding to different configurations of infrared camera 100. For example, as previously described, the process of FIG. 2 may be repeated for different infrared cameras 100 or different configurations of infrared camera 100 to store different sets of supplemental flat field correction values corresponding to various configurations of optics block 116, mounting hardware, and/or other components of infrared camera 100. Furthermore, as previously described, the process of FIG. 2 may be repeated for different temperatures of infrared camera 100 and/or components of infrared camera 100 to store different sets of supplemental flat field correction values corresponding to various temperatures of one or more components of infrared camera 100. Accordingly, in block 514, the set of supplemental flat field correction values corresponding to the current infrared camera 100, current configuration of infrared camera 100, and/or one or more temperatures of infrared camera 100, may be selected.

In embodiments where the scale factor is implemented as a value and/or map of values, application of the scale factor may include, for example, multiplying the value or values by the corresponding supplemental flat field correction value or set of values, resulting in a scaled set of supplemental flat field correction values. In embodiments where the scale factor is implemented as a function or map of functions, application of the scale factor may include, for example, calculating a scaled set of supplemental flat field correction values from one or more functions of corresponding supplemental flat field correction values or set of values and/or individual matrix and/or pixel positions, as described herein.

In block 516, processing and control block 120 applies a scaled supplemental flat field correction map to thermal image data for infrared camera 100. For example, similar to step 414 of the process of FIG. 4, processing and control block 120 may be adapted to apply a scaled set of supplemental flat field correction values determined in block 514 to thermal image data received in block 504, for example, to account for non-uniformities in at least a portion of optical path 150 (e.g., optical path 160). In some embodiments, the thermal image data may be at least partially corrected by flat field correction values associated with, for example, optical path 140 and/or one or more of steps 212 through 220 of the process of FIG. 2. In other embodiments, the thermal image data may be raw and/or uncorrected thermal image data.

As a result of block 516, processing and control block 120 provides corrected thermal image data which has been processed to account for non-uniformities along at least a portion of optical path 150. When using set of supplemental flat field correction values determined for particular configurations of infrared camera 100, non-uniformities attributable to such configurations may be corrected.

As noted herein, it is contemplated that different sets of supplemental flat field correction values may be used depending on the particular infrared camera 100 used, the configuration of infrared camera 100, and/or detected temperatures of infrared camera 100. For example, in one embodiment, processing and control block 120 may be configured to determine a single set of supplemental flat field correction values depending on detected temperatures of infrared camera 100 that, through use of a scale factor, can account for non-uniformities in at least a portion of optical path 150. In another embodiment, processing and control block 120 may be configured to select different sets of supplemental flat field correction values, or interpolate between such values, or extrapolate from such values, depending on detected temperatures of infrared camera 100. In yet another embodiment, such selections, interpolations, and/or extrapolations may be performed based on the particular infrared camera 100 used or the configuration of infrared camera 100.

In some embodiments, steps 202 through 210 of the process of FIG. 2 may be performed without an external thermal black body. For example, processing and control block 120 may be adapted to detect when thermal image data received from FPA 104 is blurred through motion, for example, or through de-focusing of one or more optical elements (e.g., a lens) of optics block 116. Such blurred thermal image data may be sufficiently smooth and/or uniform due to the motion and/or focus blurring to allow processing and control block 120 to determine a set of flat field correction values from the blurred thermal image data.

In other embodiments, infrared camera 100 may be implemented without shutter 110. In such embodiments, processing and control block 120 may be adapted to determine a set of supplemental flat field correction values through one or more iterations of, for example, steps 202 through 210 of the process of FIG. 2 (e.g., with and/or without an external thermal black body). In some embodiments, processing and control block 120 may be adapted to scale the resulting set of supplemental flat field correction values, using scale factors determined from one or more estimated temperature differences between FPA 104 and one or more components of infrared camera 100 in proximity to optical path 150, to account for non-uniformities in optical path 150.

Where applicable, the various described embodiments may be implemented using hardware, software, or combinations of hardware and software. Also where applicable, the various hardware components and/or software components set forth herein may be combined into composite components comprising software, hardware, and/or both without departing from the spirit of the disclosure. Where applicable, the various hardware components and/or software components set forth herein may be separated into sub-components comprising software, hardware, or both without departing from the spirit of the disclosure. In addition, where applicable, it is contemplated that software components may be implemented as hardware components, and vice-versa. In some embodiments, such hardware components (e.g., processing and control block 120) may be implemented as one or more appropriate processors and/or processing devices (e.g., logic device, microcontroller, processor, application specific integrated circuit (ASIC), field programmable gate array (FPGA), or other device) that may be used to execute appropriate instructions, such as software instructions implementing any of the processes described herein.

Software in accordance with the various described embodiments, such as program code and/or data, may be stored on one or more machine readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

We claim:

1. A system, comprising:
a focal plane array (FPA) of an infrared camera adapted to capture thermal image data in response to infrared radiation received by the FPA;
a memory adapted to store a set of supplemental flat field correction values that are based on a calibration of the FPA; and
a processor adapted to:
estimate a temperature difference between the FPA and a component of the infrared camera, separate from the FPA, that is in proximity to a first optical path of the infrared camera;
determine a scale factor from the estimated temperature difference;
apply the scale factor to the set of supplemental flat field correction values; and
apply the scaled set of supplemental flat field correction values to the thermal image data to adjust for non-uniformities associated with at least a portion of the first optical path.

2. The system of claim 1, further comprising a shutter located between the FPA and a lens and/or optics block of the infrared camera, wherein the processor is adapted to:
calibrate the FPA to an external scene to determine a first set of flat field correction values associated with the first optical path from the external scene to the FPA;
calibrate the FPA to the shutter to determine a second set of flat field correction values associated with a second optical path from the shutter to the FPA;
use the first and second set of flat field correction values to determine the set of supplemental flat field correction values; and
store the set of supplemental flat field correction values in the memory.

3. The system of claim 1, further comprising an optics block in the first optical path, wherein the supplemental flat field correction values are adapted to adjust for non-uniformities associated with the optics block.

4. The system of claim 1, wherein the memory is adapted to store a plurality of sets of supplemental flat field correction values to adjust for non-uniformities associated with different lenses which may be selectively inserted into the first optical path, different configurations of the infrared camera, and/or different estimated temperature differences.

5. The system of claim 1, further comprising a temperature sensor, wherein the processor is adapted to:
receive temperature data for the FPA and the component from the temperature sensor; and
determine the estimated temperature difference based on the received temperature data.

6. The system of claim 1, further comprising a temperature sensor, wherein the processor is adapted to:
receive temperature data for the FPA or the component from the temperature sensor, the thermal image data from the FPA, and/or configuration data of the infrared camera; and
determine the estimated temperature difference based on the received temperature data, the received thermal image data, and/or the received configuration data.

7. The system of claim 1, wherein the processor is adapted to:
receive the configuration data of the infrared camera; and
determine the estimated temperature difference based on the received configuration data.

8. A method of processing thermal image data captured by an infrared camera, the method comprising:
capturing thermal image data at a focal plane array (FPA) of the infrared camera;
estimating a temperature difference between the FPA and a component of the infrared camera, separate from the FPA, that is in proximity to an optical path of the infrared camera;
determining a scale factor from the estimated temperature difference;
applying the scale factor to a set of supplemental flat field correction values adapted to adjust for non-uniformities associated with at least a portion of the optical path, wherein the set of supplemental flat field correction values are based on a calibration of the FPA; and
applying the scaled set of supplemental flat field correction values to the thermal image data.

9. The method of claim 8, comprising:
calibrating the FPA to determine a first set of flat field correction values associated with an external scene;
calibrating the FPA to determine a second set of flat field correction values associated with a shutter of the infrared camera;
determining the set of supplemental flat field correction values based on the first and second set of flat field correction values; and
storing the set of supplemental flat field correction values.

10. The method of claim 8, comprising maintaining a plurality of sets of supplemental flat field correction values to adjust for non-uniformities associated with different configurations of the infrared camera and/or different estimated temperature differences.

11. The method of claim 8, wherein the estimating the temperature difference comprises:
receiving temperature data for the FPA and the component from a temperature sensor of the infrared camera; and
determining the estimated temperature difference based on the received temperature data.

12. The method of claim 8, wherein the estimating the temperature difference comprises:
receiving temperature data for the FPA or the component from the temperature sensor, the thermal image data from the FPA, and/or configuration data of the infrared camera; and
determining the estimated temperature difference based on the received temperature data, the received thermal image data, and/or the received configuration data.

13. The method of claim 8, wherein the estimating the temperature difference comprises:
receiving the configuration data of the infrared camera; and
determining the estimated temperature difference based on the received configuration data.

14. A non-transitory machine readable medium on which are stored machine readable instructions for performing the method of claim 8.

15. A method of calibrating an infrared camera, the method comprising:
calibrating a focal plane array (FPA) of the infrared camera to an external scene to determine a first set of flat field correction values associated with a first optical path from the external scene to the FPA;
estimating a temperature difference between the FPA and a component of the infrared camera, separate from the FPA, that is in proximity to the first optical path;
determining a set of supplemental flat field correction values based on, at least in part, the first set of flat field correction values, wherein the supplemental flat field correction values are adapted to be applied to thermal image data captured by the FPA to adjust for non-uniformities associated with at least a portion of the first optical path; and
storing the set of supplemental flat field correction values and the corresponding estimated temperature difference.

16. The method of claim 15, further comprising:
capturing the thermal image data using the FPA;
determining a scale factor from the estimated temperature difference, wherein the scale factor is a first value at a first estimated temperature difference and a second value at a second estimated temperature difference;
applying the scale factor to the set of supplemental flat field correction values; and
applying the scaled set of supplemental flat field correction values to the thermal image data.

17. The method of claim 16, further comprising calibrating the FPA to a shutter of the infrared camera to determine a second set of flat field correction values associated with a second optical path from the shutter to the FPA, wherein:
the set of supplemental flat field correction values are based on the first and second set of flat field correction values; and
the capturing the thermal image data comprises applying the second set of flat field correction values associated with the second optical path to infrared detectors of the FPA to adjust for non-uniformities associated with the second optical path.

18. The method of claim 15, wherein the external scene comprises a thermal black body external to the infrared camera.

19. The method of claim 15, further comprising:
iteratively adjusting a configuration and/or temperature of the infrared camera; and
repeating, for each iterative adjusting, the calibrating the FPA, the estimating the temperature difference, the determining the set of supplemental flat field correction values, and the storing the set of supplemental flat field correction values and the estimated temperature difference, wherein the repeating results in a plurality of sets of supplemental flat field correction values to adjust for non-uniformities associated with different configurations of the infrared camera and/or different estimated temperature differences.

20. The method of claim 15, wherein the estimating the temperature difference comprises:
receiving temperature data for the FPA and the component from a temperature sensor of the infrared camera; and
determining the estimated temperature difference based on the received temperature data.

21. The method of claim 15, wherein the estimating the temperature difference comprises:
receiving temperature data for the FPA or the component from the temperature sensor, the thermal image data from the FPA, and/or configuration data of the infrared camera; and
determining the estimated temperature difference based on the received temperature data, the received thermal image data, and/or the received configuration data.

22. The method of claim 15, wherein the estimating the temperature difference comprises:
receiving the configuration data of the infrared camera; and
determining the estimated temperature difference based on the received configuration data.

23. The method of claim 1, wherein the scale factor is a first value at a first estimated temperature difference and a second value at a second estimated temperature difference.

24. The method of claim 8, wherein the scale factor is a first value at a first estimated temperature difference and a second value at a second estimated temperature difference.

* * * * *